United States Patent
Kono

(10) Patent No.: US 11,084,481 B2
(45) Date of Patent: Aug. 10, 2021

(54) TRAVEL CONTROL APPARATUS

(71) Applicant: DENSO CORPORATION, Kariya (JP)

(72) Inventor: Masaki Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 16/377,294

(22) Filed: Apr. 8, 2019

(65) Prior Publication Data

US 2019/0308604 A1    Oct. 10, 2019

(30) Foreign Application Priority Data

Apr. 9, 2018 (JP) .............................. JP2018-074506

(51) Int. Cl.
*B60W 10/08* (2006.01)
*B60K 1/02* (2006.01)
*B60K 6/44* (2007.10)

(52) U.S. Cl.
CPC .............. *B60W 10/08* (2013.01); *B60K 1/02* (2013.01); *B60K 6/44* (2013.01); *B60W 2510/087* (2013.01)

(58) Field of Classification Search
CPC ... B60W 10/08; B60W 2510/087; B60K 1/02; B60K 6/44; Y02T 10/70; Y02T 10/64; Y02T 10/72; B60L 2240/423; B60L 2240/16; B60L 50/60; B60L 3/0061; B60L 2240/425
See application file for complete search history.

(56) References Cited

U.S. PATENT DOCUMENTS

2014/0229052 A1* 8/2014 Takizawa .............. B60W 20/00
                                                                    701/22
2018/0162397 A1* 6/2018 Eo ......................... B60W 10/10

FOREIGN PATENT DOCUMENTS

JP        2006-006036 A      1/2006
JP        2007-244072 A      9/2007

* cited by examiner

*Primary Examiner* — Peter D Nolan
*Assistant Examiner* — Ashley L Redhead, Jr.
(74) *Attorney, Agent, or Firm* — Oliff PLC

(57) ABSTRACT

The disclosure inhibits an increase in the temperature of a motor without hindering everyday driving.

The disclosure includes a motor temperature acquisition section, which acquires the temperature of the motor, a B&C control permission section, and a B&C control request section. The B&C control permission section and the B&C control request section are a control switching determination section, which determines whether to allow switching to an overheat limiting burn-and-coast control procedure that varies electric supply to the motor to be increased and decreased across the amount of electric supply required for constant speed traveling based on the temperature of the motor acquired by the motor temperature acquisition section.

11 Claims, 9 Drawing Sheets

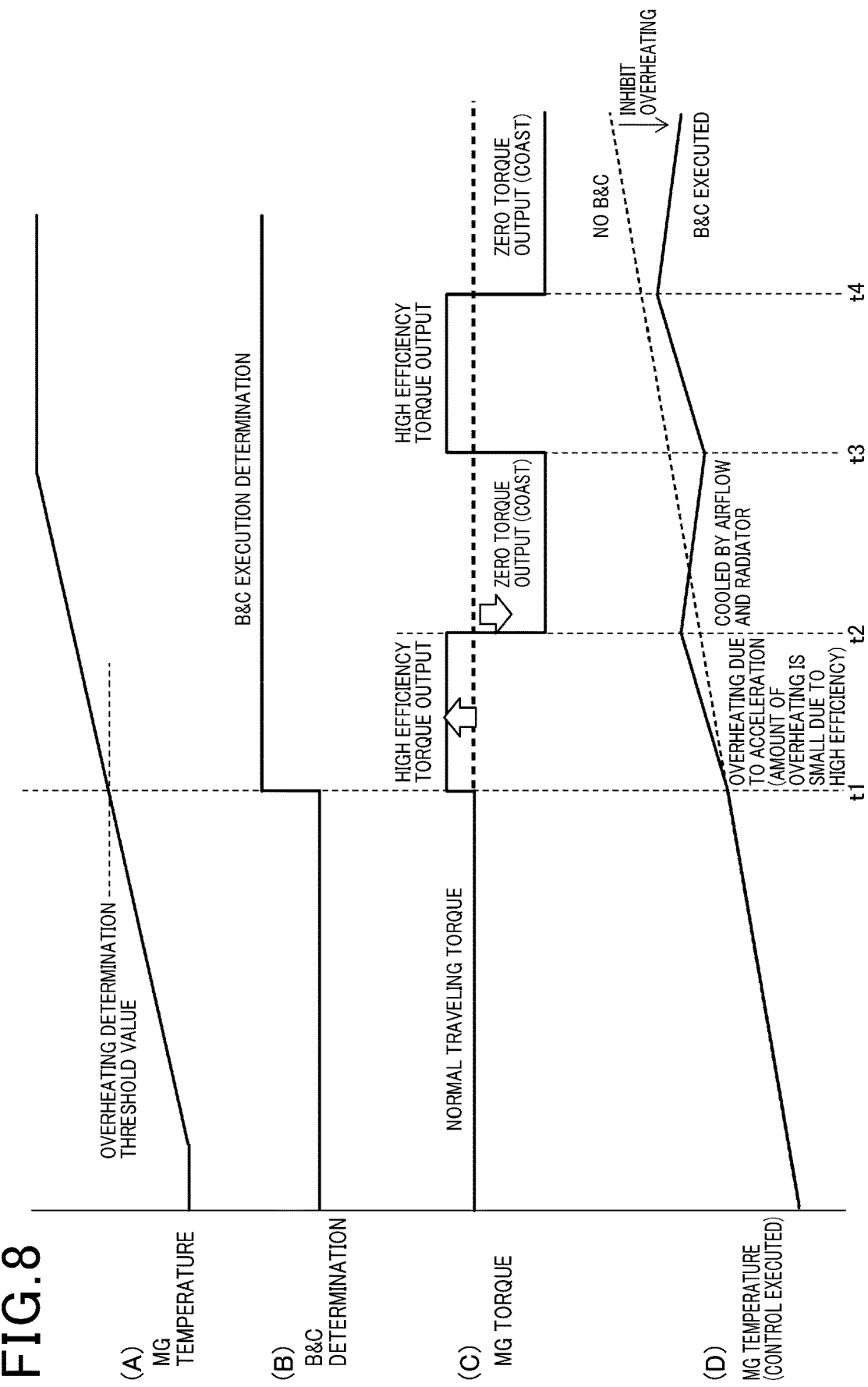

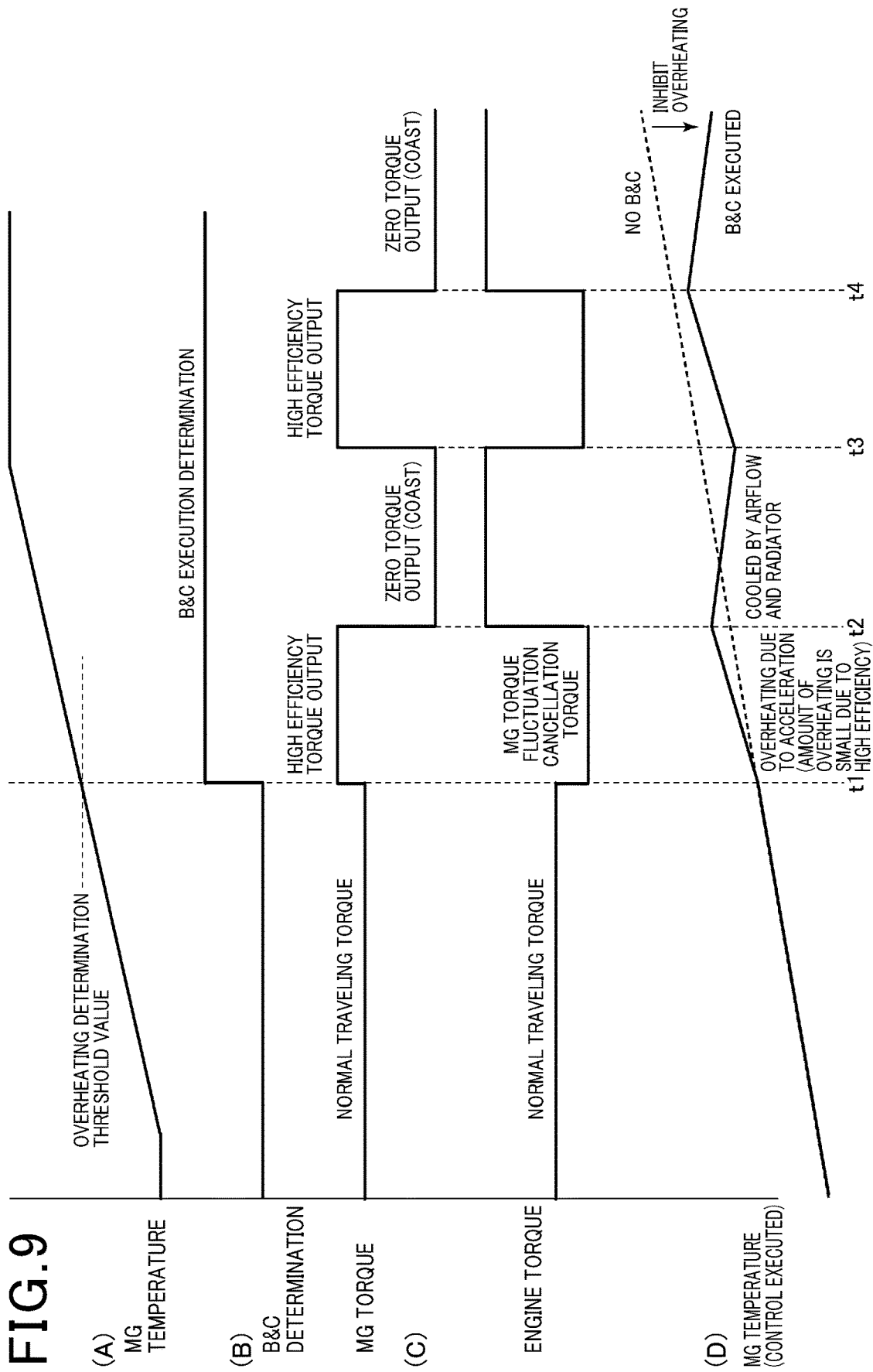

TRAVEL CONTROL APPARATUS

CROSS-REFERENCE TO RELATED APPLICATION

This application is based on and claims the benefit of priority from earlier Japanese Patent Application No. 2018-74506 filed on Apr. 9, 2018, the description of which is incorporated herein by reference.

BACKGROUND

Technical Field

The present disclosure relates to a travel control apparatus that controls the traveling state of a vehicle that travels by a driving force generated by a motor.

Description of the Related Art

An example of a travel control apparatus, the following apparatus is known. The apparatus inhibits an increase in the temperature of a motor and an inverter in a vehicle that travels by a driving force of the motor to improve the traveling performance of the vehicle.

SUMMARY

The present disclosure provides a travel control apparatus that inhibits an increase in the temperature of a motor without hindering everyday driving.

The present disclosure is a travel control apparatus that controls a traveling state of a vehicle that travels by a driving force generated by a motor. The travel control apparatus includes a motor temperature acquisition section and a control switching determination section. The motor temperature acquisition section acquires a temperature of the motor. The control switching determination section determines whether to allow switching to an overheat limiting burn-and-coast control procedure that varies electric supply to the motor to be increased and decreased across the amount of electric supply required for constant speed traveling based on the temperature of the motor acquired by the motor temperature acquisition section.

BRIEF DESCRIPTION OF THE DRAWINGS

In the accompanying drawings:

FIG. 8 shows one example of a timing diagram according to the present embodiment; and FIG. 9 shows one example of a timing diagram according to the present embodiment.

DETAILED DESCRIPTION OF THE PREFERRED EMBODIMENTS

Figure 1:
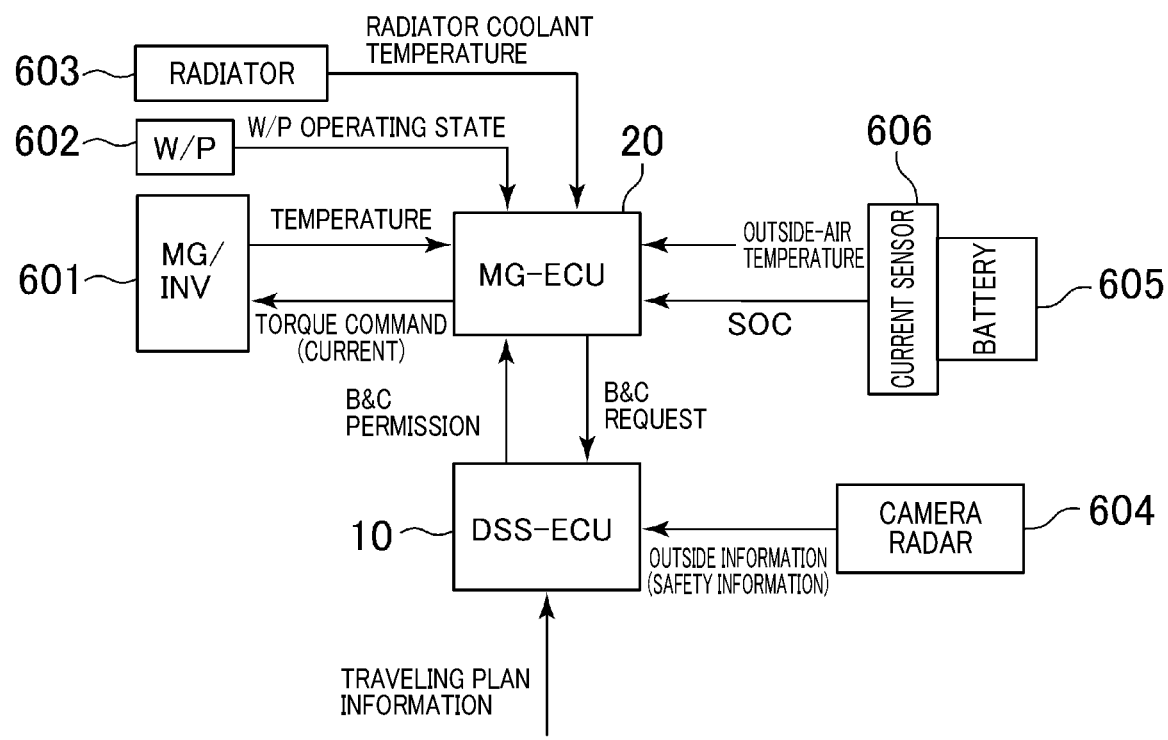
FIG. 1 is a diagram illustrating one example of the system configuration according to a present embodiment.

Hereinafter, a present embodiment will be described with reference to the attached drawings. To facilitate understanding of the description, like components in the drawings are given like numbers as much as possible, and redundant descriptions are omitted.

One example of the system configuration according to the present embodiment will be described with reference to FIG. 1. The system configuration shown in FIG.1 is one example of the system configuration of an electric vehicle. The configuration includes a driver support system (DSS)-electronic control unit (ECU) 10 and a motor generator (MG)-ECU 20 as components corresponding to a travel control apparatus of the present disclosure.

The DSS-ECU 10 performs advanced driver assistance and automated driving. The DSS-ECU 10 recognizes the surrounding conditions of a host vehicle and assists or executes driving and steering.

The DSS-ECU 10 receives the outside information about the surroundings of the host vehicle from a camera and radar system 604. The outside information about the surroundings of the host vehicle relates to the safety information and includes information about other surrounding vehicles and obstacles.

The DSS-ECU 10 receives traveling plan information from, for example, a navigation system. The DSS-ECU 10 estimates how much load is likely to be applied to the host vehicle based on the traveling plan information.

The MG-ECU 20 outputs current that serves as a torque command to a MG/INV 601, which corresponds to a motor of the present disclosure. The MG/INV 601 includes a motor generator, which serves as the motor of the present disclosure, and an inverter. The MG/INV 601 outputs the temperature of the motor generator to the MG-ECU 20.

A water pump 602 is a pump for circulating a coolant of the MG/INV 601. The operating state of the water pump 602 is outputted to the MG-ECU 20.

A radiator 603 is a heat exchanger for cooling the coolant of the MG/INV 601. A radiator fan (not shown) is also provided in the vicinity of the radiator 603. The coolant temperature of the radiator 603 and the operating state of the radiator fan are outputted to the MG-ECU 20.

A battery 605 is a battery that supplies electric power for driving the MG/INV 601. The battery 605 is provided with a battery sensor 606. The battery sensor 606 detects the state of charge (SOC) of the battery 605 and outputs the SOC to the MG-ECU 20. The MG-ECU 20 also receives information indicating the outside-air temperature. The outside-air temperature may be detected through the output data transmitted from an outside-air temperature sensor (not shown), or may be acquired from the outside air temperature information via a vehicle network.

If a predetermined condition is satisfied, the MG-ECU 20 outputs a B&C request signal for performing burn-and-coast driving to the DSS-ECU 10. The DSS-ECU 10 determines whether to perform the burn-and-coast driving based on the outside information and the traveling plan information and outputs a B&C permission signal to the MG-ECU 20 when permitting the burn-and-coast driving. Upon receipt of the B&C permission signal, the MG-ECU 20 increases and decreases the torque command to the MG/INV 601 and performs the burn-and-coast driving in which acceleration and deceleration are repeated.

Figure 2:
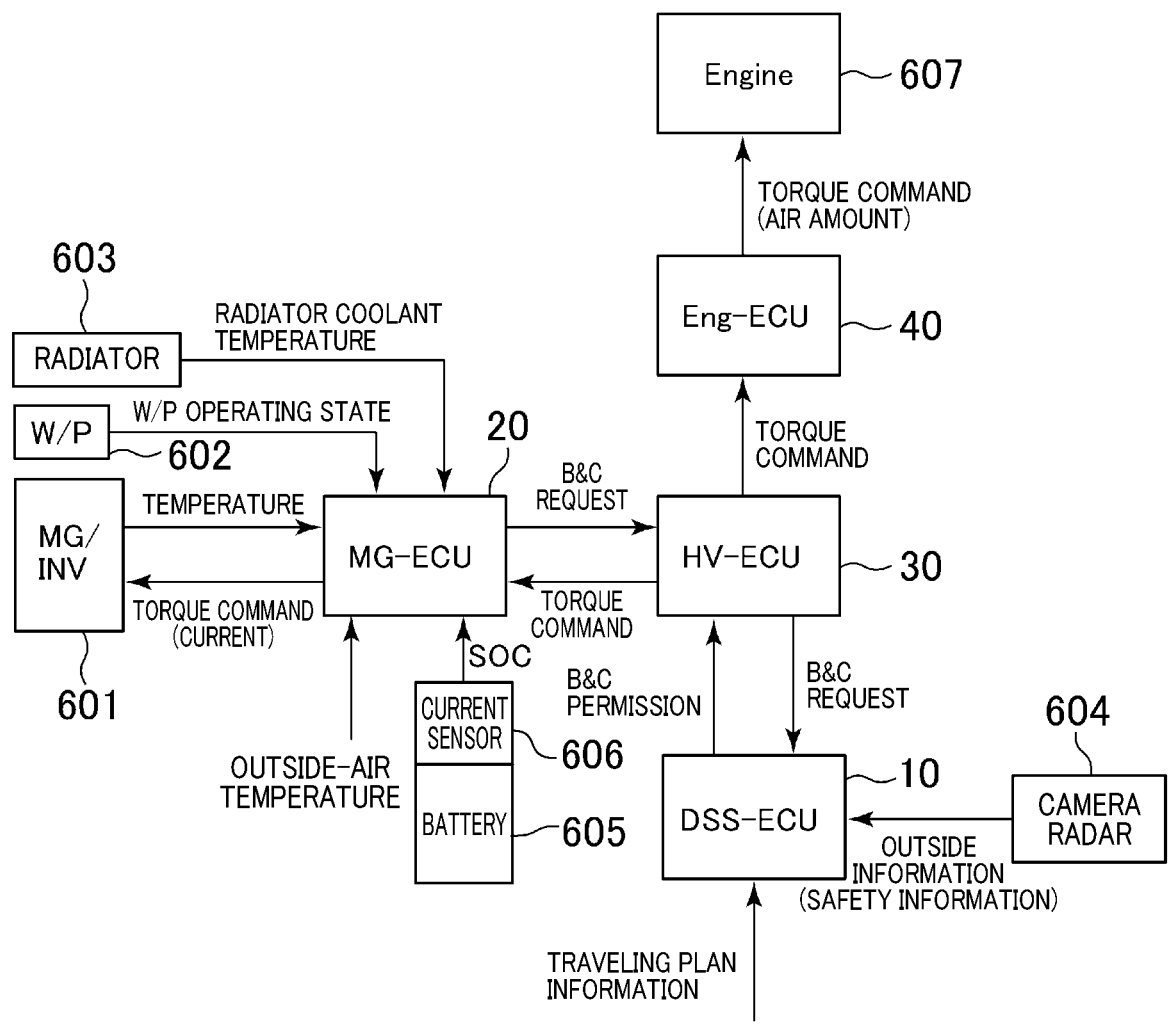
FIG. 2 is a diagram illustrating one example of the system configuration according to the present embodiment.

Subsequently, one example of the system configuration according to the present embodiment will be described with reference to FIG. 2. The system configuration shown in FIG. 2 is one example of the system configuration of a hybrid vehicle. The description of FIG. 2 omits the descriptions for the parts that are the same as those in FIG. 1. In addition to the DSS-ECU 10 and the MG-ECU 20, the configuration includes a hybrid (HV)-ECU 30 and an engine (Eng)-ECU 40 as components corresponding to the travel control apparatus of the present disclosure.

The HV-ECU 30 outputs a torque command to the MG-ECU 20 or the Eng-ECU 40 in accordance with the driving conditions. If the torque command is outputted to the MG-ECU 20, the MG/INV 601 is driven. If the torque command is outputted to the Eng-ECU 40, an engine 607 is driven.

If a predetermined condition is satisfied, the MG-ECU 20 outputs a B&C request signal for performing burn-and-coast driving to the HV-ECU 30. The HV-ECU 30 outputs a B&C request signal to the DSS-ECU 10. The DSS-ECU 10 determines whether to perform the burn-and-coast driving based on the outside information and the traveling plan information and outputs a B&C permission signal to the HV-ECU 30 when permitting the burn-and-coast driving. The HV-ECU 30 outputs the B&C permission signal to the MG-ECU 20. Upon receipt of the B&C permission signal, the MG-ECU 20 increases and decreases the torque command to the MG/INV 601 and performs the burn-and-coast driving in which acceleration and deceleration are repeated.

Figure 3:
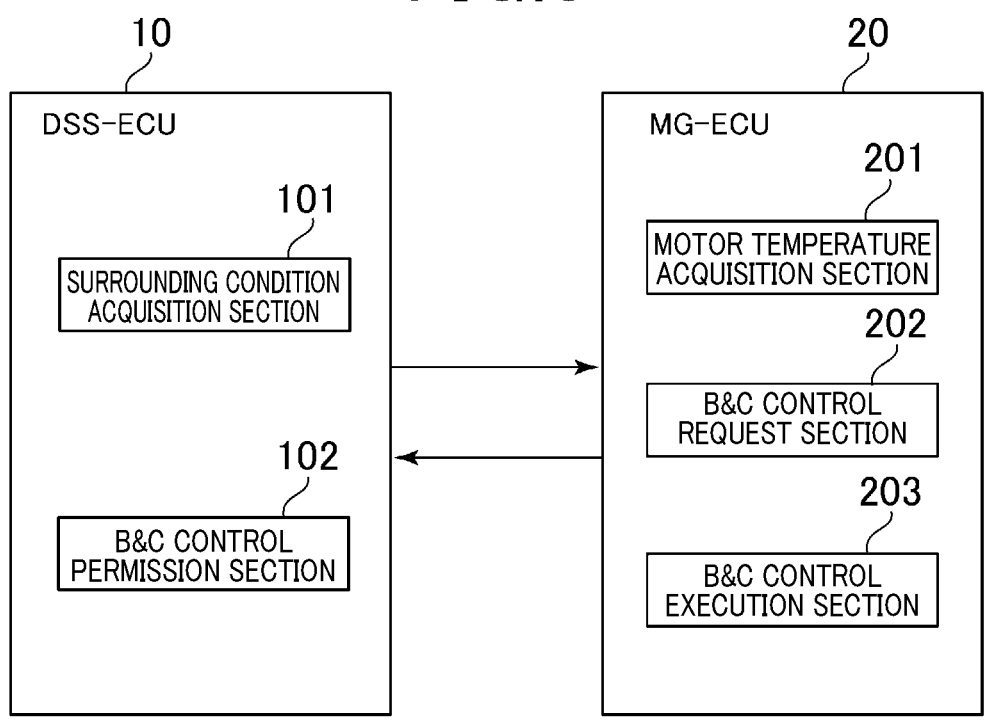
FIG. 3 is a block diagram illustrating the functional configuration according to the present embodiment.

Subsequently, the functional components of the DSS-ECU 10 and the MG-ECU 20, which are the main components that exchange the B&C request signal and the B&C permission signal, will be described with reference to FIG. 3. The functional components shown in FIG. 3 may be applied to both the system configuration shown in FIG. 1 and the system configuration shown in FIG. 2. Furthermore, the functional components of the DSS-ECU 10 and the MG-ECU 20 are not limited to the embodiment described below, functions may be interchanged, or the functions may be converged into one of the ECUs or a separate ECU.

The MG-ECU 20 includes, as the functional components, a motor temperature acquisition section 201, a B&C control request section 202, and a B&C control execution section 203. The B&C control request section 202 corresponds to a control switching determination section of the present disclosure.

The motor temperature acquisition section 201 detects the temperature of the MG/INV 601. The motor temperature acquisition section 201 detects the temperature based on the signal outputted from a motor temperature sensor provided in the MG/INV 601. The motor temperature sensor is located to directly detect the temperature of the motor generator of the MG/INV 601.

Instead of the temperature sensor provided in the motor generator of the MG/INV 601, the motor temperature acquisition section 201 may acquire the temperature of the motor generator based on a measured value of the current that flows through an electrical system (for example, the inverter) outside the motor that correlates with the temperature of the motor generator.

The motor temperature acquisition section 201 may acquire the temperature of the motor based on the outside-air temperature and the traveling plan of the host vehicle. The motor temperature acquisition section 201 may acquire the temperature of the motor based on the outside-air temperature and the traveling history of the host vehicle. The traveling plan and the traveling history may be recognized based on the information outputted from the DSS-ECU 10.

If execution requirements of an overheat limiting burn-and-coast control procedure that repeats acceleration and deceleration of the vehicle are satisfied, the B&C control request section 202 sends a request for the execution of the overheat limiting burn-and-coast control procedure to the DSS-ECU 10.

The B&C control execution section 203 executes the overheat limiting burn-and-coast control procedure upon receipt of an execution permission signal from the DSS-ECU 10 in response to the request for the execution of the overheat limiting burn-and-coast control procedure sent to the DSS-ECU 10 by the B&C control request section 202. The B&C control execution section 203 executes the overheat limiting burn-and-coast control procedure by outputting, to the MG/INV 601, instructions to increase and decrease electric power to the motor generator of the MG/INV 601.

The DSS-ECU 10 includes a surrounding condition acquisition section 101 and a B&C control permission section 102 as the functional components. The B&C control permission section 102 corresponds to a control switching determination section of the present disclosure. The B&C control permission section 102 cooperates with the B&C control request section 202 to execute the control procedure corresponding to the control procedure executed by the control switching determination section of the present disclosure.

The DSS-ECU 10 and the MG-ECU 20 of the present embodiment are the travel control apparatus, which controls the traveling state of the vehicle that travels by the driving force generated by the motor, and include the motor temperature acquisition section 201, which acquires the temperature of the motor, and the B&C control request section 202 and the B&C control permission section 102, which correspond to the control switching determination section. The control switching determination section determines whether to allow the switching to the overheat limiting burn-and-coast control procedure, which varies the amount of electric supply to the motor over the amount of electric supply required for the constant speed traveling based on the temperature of the motor acquired by the motor temperature acquisition section 201.

When the overheat limiting burn-and-coast control procedure, which varies the electric power to the motor over the amount of electric power required for the constant speed traveling, is executed, the vehicle is put into the traveling state that repeats acceleration and deceleration. While the amount of heat generation of the motor is increased during acceleration since the current that flows through the motor is increased compared with a case in which the vehicle is traveling at a constant speed, the motor is cooled during deceleration since the current that flows through the motor is decreased compared with a case in which the vehicle is traveling at a constant speed. When the traveling state that repeats acceleration and deceleration is compared with the constant speed traveling, the traveling state that repeats acceleration and deceleration to repeat heating and cooling of the motor inhibits the increase in the temperature of the motor better. Thus, determining whether to allow switching to the overheat limiting burn-and-coast control procedure based on the temperature of the motor prevents excessively limiting the driving of the motor, controls divergence of the average vehicle speed from the constant speed traveling to be within a predetermined range by repeating acceleration and deceleration of the vehicle, and inhibits excessive increase in the temperature of the motor. Preferred embodiment may also include assisting the engine to inhibit acceleration and deceleration of the vehicle even if the overheat limiting burn-and-coast control procedure is executed since the increase in the temperature of the motor is inhibited by executing the overheat limiting burn-and-coast control procedure, which varies electric power to the motor to be increased and decreased across the amount of electric power required for constant speed traveling. (refer to the following description of FIG. 9).

The DSS-ECU 10 of the present embodiment further includes the surrounding condition acquisition section 101, which acquires the surrounding conditions of the host vehicle. The B&C control request section 202 and the B&C control permission section 102 autonomously determine whether to switch to the overheat limiting burn-and-coast control procedure based on the surrounding conditions of the host vehicle acquired by the surrounding condition acquisition section 101 in addition to the temperature of the motor.

The switching to the overheat limiting burn-and-coast control procedure, in which acceleration and deceleration are repeated, may be inappropriate depending on the surrounding conditions of the host vehicle such as a case in which another vehicle exists closely in front or at the rear of the host vehicle. Given these factors, considering the surrounding conditions of the host vehicle in addition to the temperature of the motor makes it possible to reduce causing, for example, a driver of another vehicle to feel uncomfortable even if the switching to the overheat limiting burn-and-coast control procedure is autonomously determined.

In the present embodiment, the B&C control request section 202, which serves as the control switching determination section, may autonomously determine the switching to the overheat limiting burn-and-coast control procedure based on the ease of cooling the motor in addition to the temperature of the motor.

Compared with a case in which the radiator 603, the radiator fan, and the water pump 602 are operated without any fault, the ease of cooling the motor is lowered when there is a fault in any of the above components. The ease of cooling the motor is also lowered when the size of the radiator is relatively small. The ease of cooling the motor is also lowered when the outside-air temperature is relatively high or the vehicle speed is relatively low since the cooling effect of the airflow generated by the vehicle movement is decreased. If the ease of cooling the motor is low as described above, the switching to the overheat limiting burn-and-coast control procedure is performed from a lower motor temperature to inhibit an excessive increase in the temperature of the motor.

In the present embodiment, the motor temperature acquisition section 201 acquires the temperature of the motor from the motor temperature sensor, which directly detects the motor temperature.

Since the motor temperature sensor is located to detect the temperature close to the mainly heated part of the motor such as the stator of the motor, an appropriate temperature for preventing the motor from overheating is acquired, and whether to allow the switching to the overheat limiting burn-and-coast control procedure is appropriately determined.

In the present embodiment, the motor temperature acquisition section 201 may acquire the temperature of the motor based on a measured value of the current that flows through an electrical system (for example, the inverter) outside the motor that correlates with the temperature of the motor.

The current that flows through the electrical system outside the motor may be acquired using, for example, a current integrator, which measures and integrates the current that flows through the electrical system outside the motor, or may be acquired indirectly without providing a sensor. With this being the case, the temperature of the motor is acquired without providing the motor temperature sensor.

In the present embodiment, the motor temperature acquisition section 201 may acquire the temperature of the motor based on the outside-air temperature and the traveling plan of the host vehicle.

In a case in which the traveling plan of the host vehicle can be recognized like in the automated driving, it is assumed that the driving state of the motor differs depending on the traveling plan, and the amount of heat generation of the motor also differs. Thus, the temperature of the motor is acquired by taking the outside-air temperature into consideration.

In the present embodiment, the motor temperature acquisition section 201 may acquire the temperature of the motor based on the outside-air temperature and the traveling history of the host vehicle. Since the driving state of the motor differs depending on the traveling history, and the amount of heat generation of the motor also differs, the temperature of the motor is acquired by taking the outside-air temperature into consideration.

In the present embodiment, the traveling history may include at least one of the fluctuation history of the outside-air temperature during traveling, the fluctuation history of the supplied power to the motor, the fluctuation history of the coolant temperature in the radiator in which the coolant for cooling the motor circulates, the operating state history of the radiator fan, which supplies air to the radiator for heat exchange, and the operating state history of the water pump 602 for circulating the coolant. The pieces of information exemplified as the traveling history are output from the MG-ECU 20 to the DSS-ECU 10.

The overheat limiting burn-and-coast control procedure of the present embodiment may also predict how easily the motor temperature will increase and set a target acceleration in accordance with the predicted result. The target acceleration is set by the B&C control execution section 203.

If it is predicted that the temperature of the motor is easy to be increased, the motor is powered at an operating point at which the motor efficiency is high. Since there is a strong acceleration feel, an occupant might feel uncomfortable, but the cooling efficiency of the motor is increased. If it is predicted that the temperature of the motor is not easy to be increased, a higher priority is put on the vehicle behavior that does not cause the occupant to feel uncomfortable, and the motor is powered at an operating point at which the motor efficiency is not high. This enables cooling of the motor to be compatible with the comfort of the occupant.

The overheat limiting burn-and-coast control procedure of the present embodiment changes the cycle of acceleration and deceleration in accordance with the fluctuation of the vehicle speed or the charge level of the battery, which supplies power to the motor. The cycle of acceleration and deceleration is set by the B&C control execution section 203.

Since the cycle of acceleration and deceleration is changed in accordance with the charge level of the battery, for example, even if the battery capacity is small, frequent occurrences of the fully charged condition and the complete discharged condition are avoided.

Figure 4:
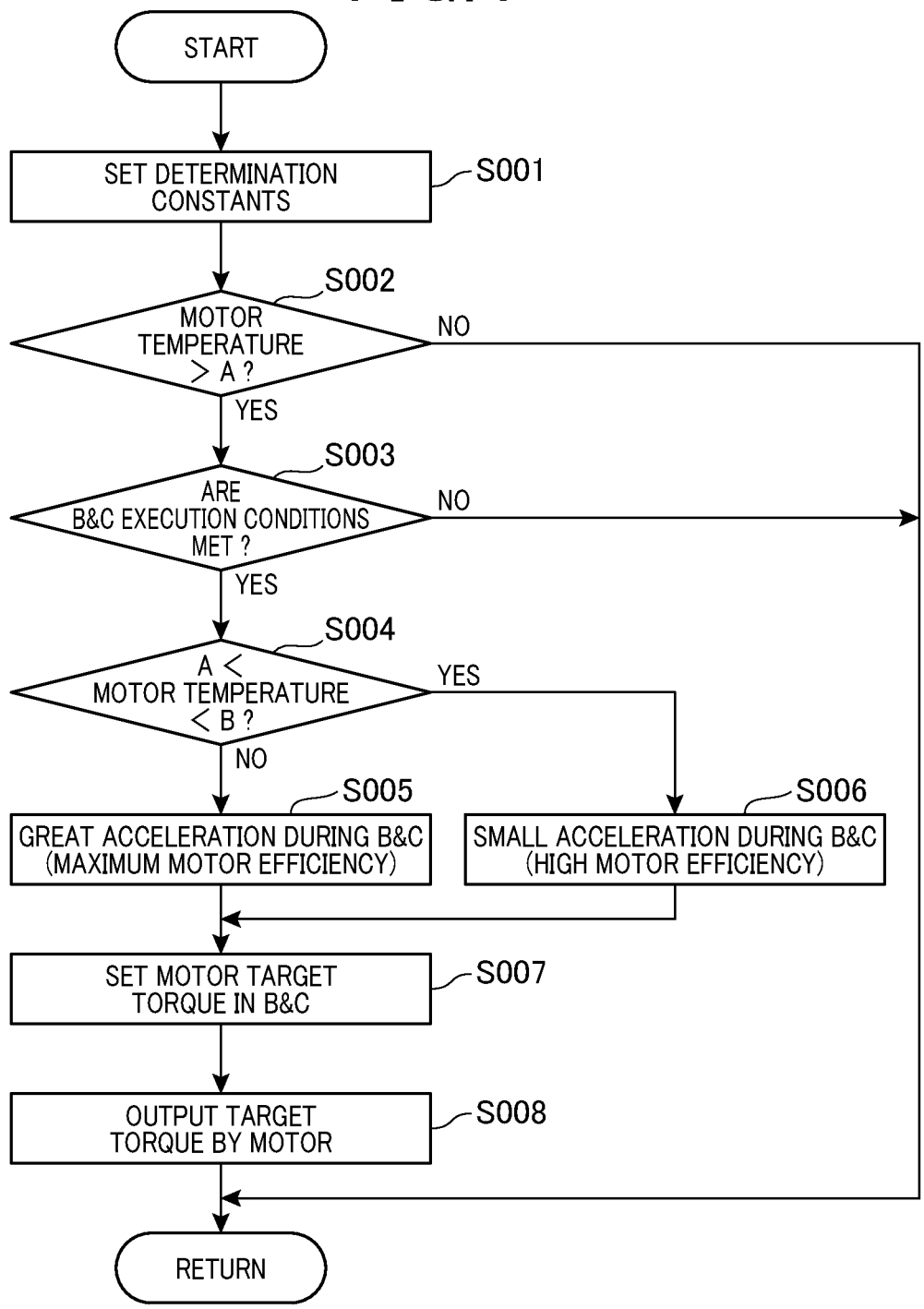
FIG. 4 is a flowchart showing a control process according to the present embodiment.

Subsequently, the control flow of the DSS-ECU 10 and the MG-ECU 20 according to the present embodiment will be described with reference to the flowchart shown in FIG. 4. FIG. 4 is the control flow of a case in which the host vehicle is an electric vehicle.

At step S001, the B&C control request section 202 of the MG-ECU 20 sets determination constants A and B for determining whether the motor is overheated. The determination constant A is set to a value smaller than the determination constant B.

Figure 6:
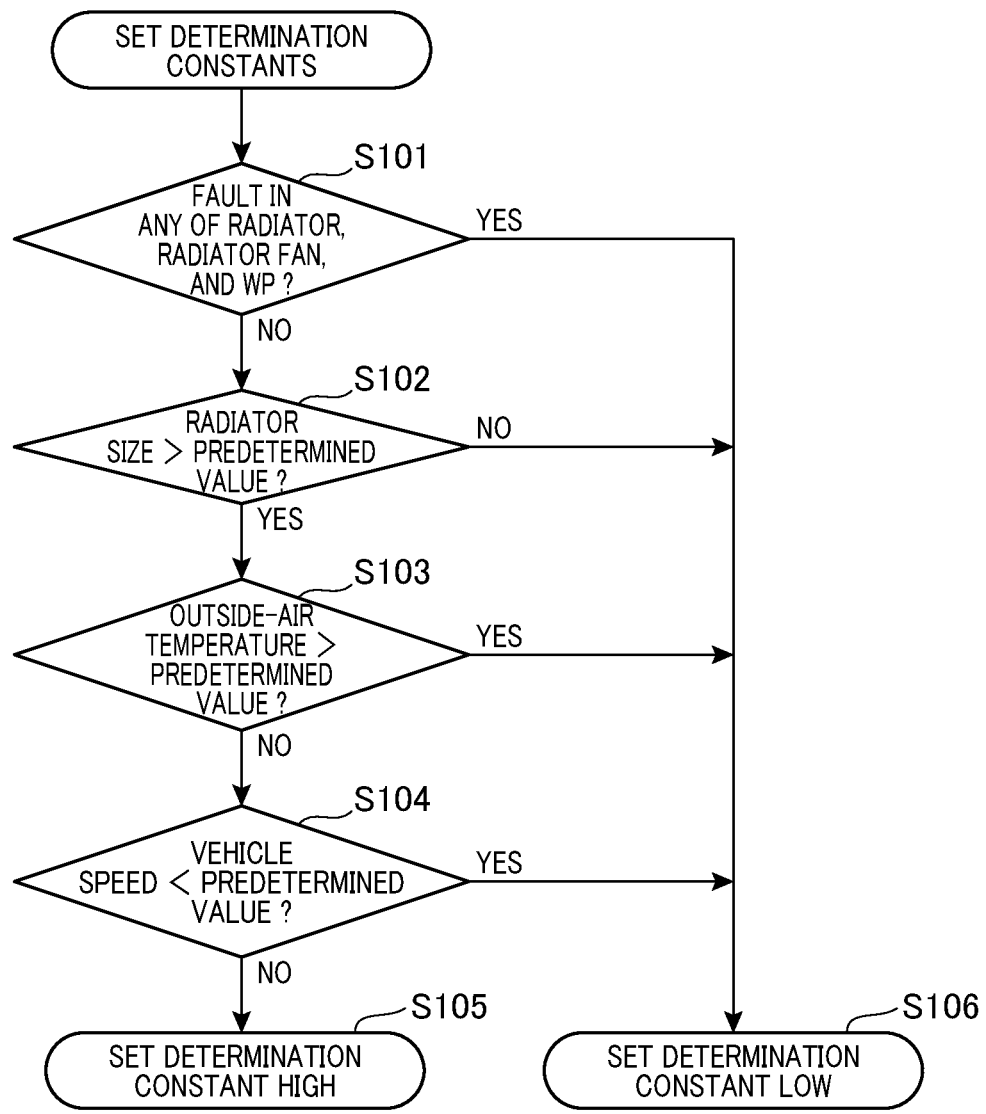
FIG. 6 is a flowchart showing a control process according to the present embodiment.

The setting flow of the determination constants A and B will be described with reference to FIG. 6. At step S101, the B&C control request section 202 determines whether there is a fault in any of the radiator 603, the radiator fan, and the water pump 602. If there is a fault in any of the radiator 603, the radiator fan, and the water pump 602, the cooling capability of the motor is decreased. Thus, it is necessary to set the constant so that a higher priority is put on cooling of the motor. If there is a fault in any of the above components (YES at step S101), the flow proceeds to the process of step S106. If there is no fault in any of the above components (NO at step S101), the flow proceeds to the process of step S102.

At step S102, the B&C control request section 202 determines whether the size of the radiator 603 is greater than a predetermined value. If the size of the radiator 603 is less than or equal to the predetermined value, the cooling capability of the motor is low. Thus, the determination constant needs to be set so that a higher priority is put on cooling of the motor.

If the size of the radiator 603 is greater than the predetermined value (YES at step S102), the flow proceeds to the process of step S103. If the size of the radiator 603 is less than or equal to the predetermined value (NO at step S102), the flow proceeds to the process of step S106.

At step S103, the B&C control request section 202 determines whether the value indicating the outside-air temperature is greater than a predetermined value. If the outside-air temperature is high, the cooling effect of the airflow generated by the vehicle movement is decreased, and the temperature of the motor becomes easy to be increased. Thus, the determination constant needs to be set so that a higher priority is put on cooling of the motor.

If the value indicating the outside-air temperature is greater than the predetermined value (YES at step S103), the flow proceeds to the process of step S106. If the value indicating the outside-air temperature is less than or equal to the predetermined value (NO at step S103), the flow proceeds to the process of step S104.

At step S104, the B&C control request section 202 determines whether the value indicating the vehicle speed is less than a predetermined value. If the initial speed is low, the cooling effect of the airflow generated by the vehicle movement is decreased, and the motor temperature becomes easy to be increased. Thus, the determination constant needs to be set so that a higher priority is put on cooling of the motor.

If the value indicating the vehicle speed is less than the predetermined value (YES at step S104), the flow proceeds to the process of step S106. If the value indicating the vehicle speed is greater than or equal to the predetermined value (NO at step S104), the flow proceeds to the process of step S105.

At step S105, the B&C control request section 202 sets the determination constant A and the determination constant B to be relatively high. At step S106, the B&C control request section 202 sets the determination constant A and the determination constant B to be relatively low.

After completing the setting of the determination constants, the flow proceeds to the process of step S002 of FIG. 4. At step S002, the B&C control request section 202 determines whether the numerical value indicating the temperature of the motor generator of the MG/INV 601 is greater than the determination constant A. If the numerical value indicating the temperature of the motor generator is greater than the determination constant A (YES at step S002), the flow proceeds to the process of step S003. If the numerical value indicating the temperature of the motor generator is less than or equal to the determination constant A (NO at step S002), the flow returns to START. If the numerical value indicating the temperature of the motor generator is greater than the determination constant A, the B&C control request section 202 sends a request for execution of the overheat limiting burn-and-coast control procedure to the DSS-ECU 10.

At step S003, the B&C control permission section 102 determines whether the conditions for performing the overheat limiting burn-and-coast control procedure are met.

Figure 7:
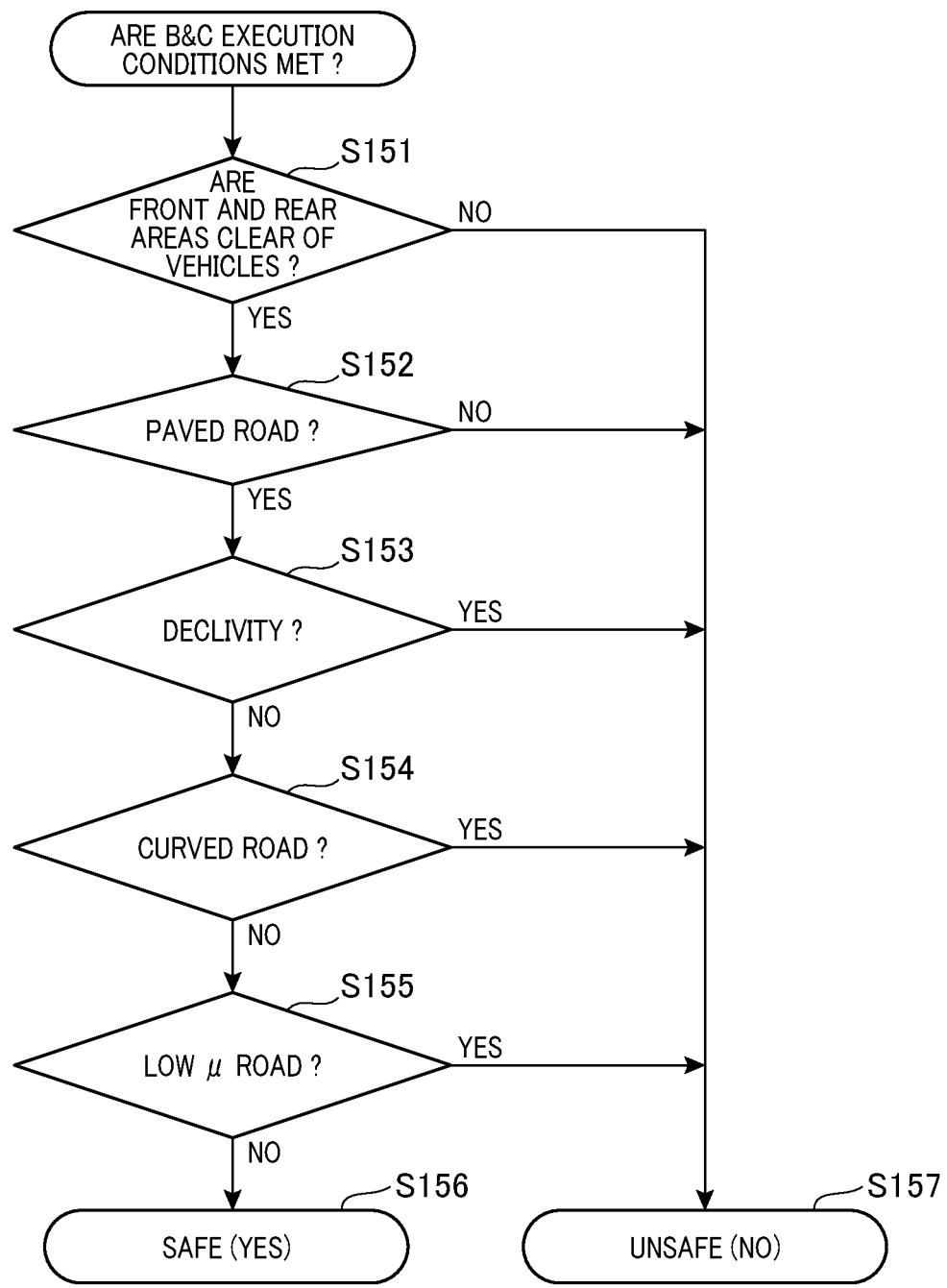
FIG. 7 is a flowchart showing a control process according to the present embodiment.

The determination of whether the conditions for performing the overheat limiting burn-and-coast control procedure are met will be described with reference to FIG. 7. At step S151, the B&C control permission section 102 determines whether the front and rear areas of the host vehicle are clear of other vehicles. When the overheat limiting burn-and-coast control procedure is performed, the vehicle speed is increased and decreased. Thus, if another vehicle exists in front or at the rear of the host vehicle, the distance between the vehicles may possibly be decreased excessively. In this case, it is an inappropriate condition for executing the overheat limiting burn-and-coast control procedure.

If another vehicle does not exist in front or at the rear of the host vehicle (YES at step S151), the flow proceeds to the process of step S152. If another vehicle exists in front or at the rear of the host vehicle (NO at step S151), the flow proceeds to the process of step S157.

At step S152, the B&C control permission section 102 determines whether the road on which the host vehicle is traveling is a paved road. The determination of whether the road on which the host vehicle is traveling is a paved road is made based on the rotation difference among the four wheels. If the road is a bad road, one or some of the wheels spin free, and the rotation difference occurs. If the road on which the host vehicle is traveling is a paved road, repeating the acceleration and the deceleration, in particular, repeating the acceleration increases the possibility that the host vehicle skids. Thus, it is an inappropriate condition for executing the overheat limiting burn-and-coast control procedure.

If the road on which the host vehicle is traveling is a paved road (YES at step S152), the flow proceeds to the process of step S153. If the road on which the host vehicle is traveling is not a paved road (NO at step S152), the flow proceeds to the process of step S157.

At step S153, the B&C control permission section 102 determines whether the road on which the host vehicle is traveling is a declivity. The determination of whether the road on which the host vehicle is traveling is a declivity is made in accordance with an output value from an onboard acceleration sensor. If the road on which the host vehicle is traveling is a declivity, repeating the acceleration and the deceleration, in particular, repeating the acceleration increases the possibility that the host vehicle is excessively accelerated. Thus, it is an inappropriate condition for executing the overheat limiting burn-and-coast control procedure.

If the road on which the host vehicle is traveling is a declivity (YES at step S153), the flow proceeds to the process of step S157. If the road on which the host vehicle is traveling is not a declivity (NO at step S153), the flow proceeds to the process of step S154.

At step S154, the B&C control permission section 102 determines whether the road on which the host vehicle is traveling is a curved road. The determination of whether the road on which the host vehicle is traveling is a curved road is made in accordance with the steering angle. If the road on which the host vehicle is traveling is a curved road, the vehicle cannot coast. Thus, it is an inappropriate condition for executing the overheat limiting burn-and-coast control procedure.

If the road on which the host vehicle is traveling is a curved road (YES at step S154), the flow proceeds to the process of step S157. If the road on which the host vehicle is traveling is not a curved road (NO at step S154), the flow proceeds to the process of step S155.

At step S155, the B&C control permission section 102 determines whether the road on which the host vehicle is traveling is a low μ road. The determination of whether the road on which the host vehicle is traveling is a low μ road is made based on the rotation difference among the four wheels. If the road is a bad road, one or some of the wheels may spin free, and a rotation difference occurs. If the host vehicle is traveling on a low μ road, repeating the acceleration and the deceleration, in particular repeating the acceleration, increases the possibility that the host vehicle may skid. Thus, it is an inappropriate condition for executing the overheat limiting burn-and-coast control procedure.

If the road on which the host vehicle is traveling is a low μ road (YES at step S155), the flow proceeds to the process of step S157. If the road on which the host vehicle is traveling is not a low μ road (NO at step S155), the flow proceeds to the process of step S156.

At step S156, the B&C control permission section 102 determines that the traveling conditions are safe, and the conditions for performing the overheat limiting burn-and-coast control procedure are met. At step S157, the B&C control permission section 102 determines that the traveling conditions are unsafe, and the conditions for performing the overheat limiting burn-and-coast control procedure are not met.

After completion of the determination of whether the conditions for performing the overheat limiting burn-and-coast control procedure are met, and if it is determined that the conditions for performing the overheat limiting burn-and-coast control procedure are met, the flow proceeds to the process of step S004 of FIG. 4. If it is determined that the conditions for performing the overheat limiting burn-and-coast control procedure are not met, the flow goes back to FIG. 4 and returns to START.

At step S003, if it is determined that the traveling conditions are safe, and the conditions for performing the overheat limiting burn-and-coast control procedure are met, the B&C control permission section 102 transmits the B&C control permission signal to the MG-ECU 20.

At step S004, the B&C control execution section 203 of the MG-ECU 20 determines whether the numerical value indicating the temperature of the motor generator of the MG/INV 601 is greater than the determination constant A and less than the determination constant B. If the numerical value indicating the temperature of the motor generator is greater than the determination constant A and less than the determination constant B (YES at step S004), the flow proceeds to the process of step S006. If the numerical value indicating the temperature of the motor generator is greater than the determination constant A and greater than or equal to the determination constant B (NO at step S004), the flow proceeds to the process of step S005.

At step S005, the B&C control execution section 203 sets the acceleration in the overheat limiting burn-and-coast control procedure to be relatively great so that the motor efficiency is maximized. At step S006, the B&C control execution section 203 sets the acceleration in the overheat limiting burn-and-coast control procedure to be smaller than the case in step S005 so that the motor efficiency is relatively high.

At step S007, the B&C control execution section 203 sets the target torque of the motor generator to achieve the acceleration set in step S005 or step S006 and outputs the target torque to the MG/INV 601.

At step S008, the target torque is output by the motor generator of the MG/INV 601.

One example of the torque change and the change in the motor generator temperature when the overheat limiting burn-and-coast control procedure described with reference to FIG. 4 is executed will be described with reference to FIG. 8. FIG. 8(A) shows changes in the motor generator temperature when the overheat limiting burn-and-coast control procedure is not executed. FIG. 8(B) shows a flag indicating whether to execute the overheat limiting burn-and-coast control procedure. FIG. 8(C) shows the output torque of the motor generator. FIG. 8(D) shows changes in the motor generator temperature when the overheat limiting burn-and-coast control procedure is executed.

At a point in time t1, the determination of step S003 of FIG. 4 is made, and if it is determined that the conditions for executing the overheat limiting burn-and-coast control procedure are met, the overheat limiting burn-and-coast control procedure is started with the acceleration set in step S005 or step S006.

The time period from the point in time t1 to a point in time t2 corresponds to an acceleration phase (burn phase), and a high-efficiency torque that is higher than the normal traveling torque is outputted. The motor generator is overheated due to the acceleration from the point in time t1 to the point in time t2. However, since the torque is outputted to achieve high-efficiency operation, the amount of overheating is relatively small.

The time period from the point in time t2 to a point in time t3 corresponds to a deceleration phase (coast phase), and no torque is output. During the time period from the point in time t2 to the point in time t3, the temperature of the motor generator is decreased due to the effect of the airflow that is taken in during deceleration and directly cools the motor generator and the effect of the airflow that cools the coolant circulating in the radiator 603 and indirectly cools the motor generator.

The time period from the point in time t3 to a point in time t4 corresponds to the acceleration phase (burn phase), and a high-efficiency torque that is higher than the normal traveling torque is outputted. The motor generator is overheated due to the acceleration from the point in time t3 to the point in time t4. However, since the torque is outputted to achieve high-efficiency operation, the amount of overheating is relatively small.

Performing the overheat limiting burn-and-coast control procedure in this manner even after the point in time t4 inhibits the motor generator from being overheated compared with a case in which the overheat limiting burn-and-coast control procedure is not performed.

Figure 5:
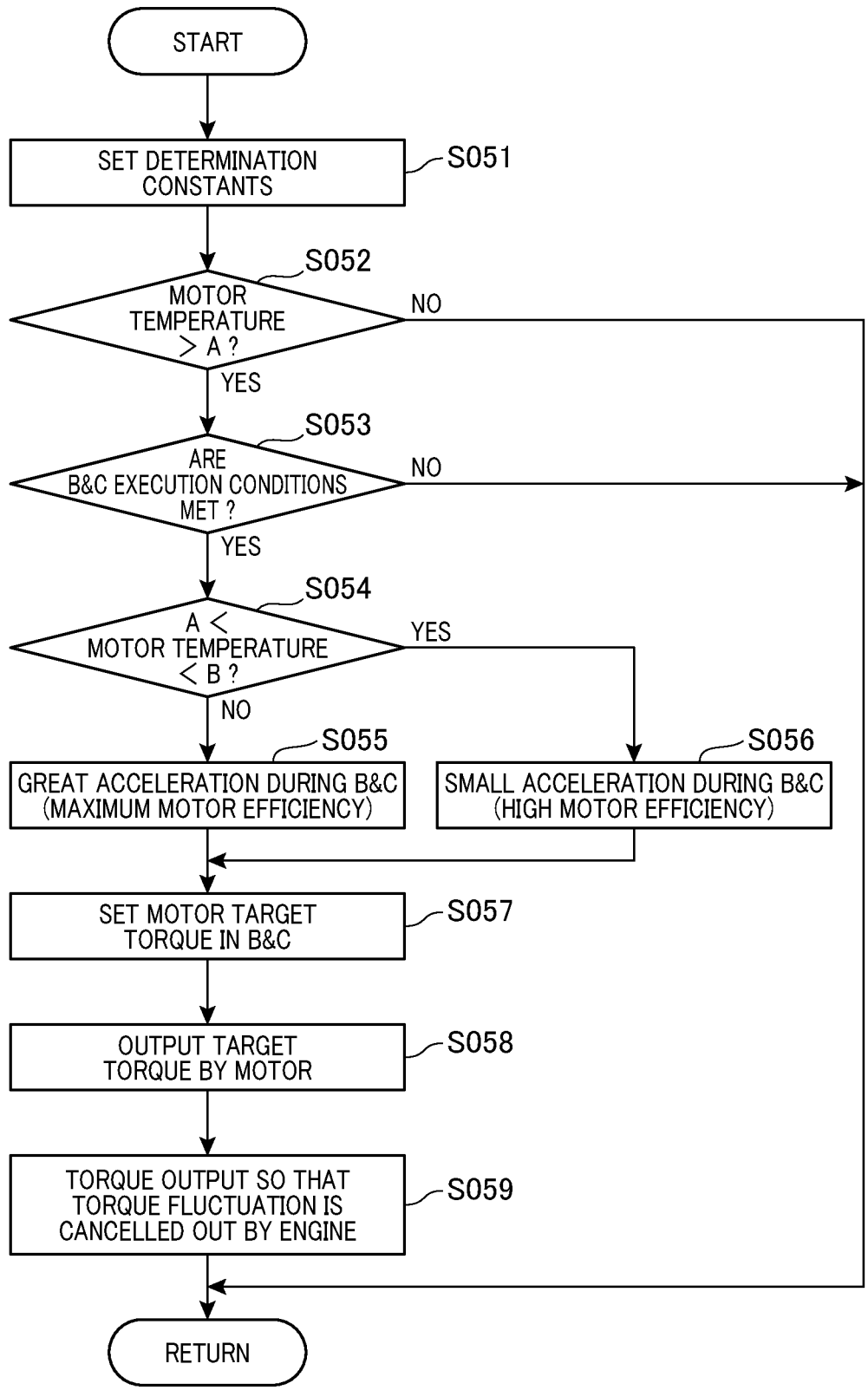
FIG. 5 is a flowchart showing a control process according to the present embodiment.

Subsequently, the control flow of the DSS-ECU 10 and the MG-ECU 20 according to the present embodiment will be described with reference to the flowchart shown in FIG. 5. FIG. 5 is a control flow of a case in which the host vehicle is a hybrid vehicle.

At step S051, the B&C control request section 202 of the MG-ECU 20 sets determination constants A and B for determining whether the motor is overheated. Since the process of step S051 is the same as the process of step S001, the detailed description is omitted.

At step S052 subsequent to step S051, the B&C control request section 202 determines whether the numerical value indicating the temperature of the motor generator of the MG/INV 601 is greater than the determination constant A. If the numerical value indicating the temperature of the motor generator is greater than the determination constant A (YES at step S052), the flow proceeds to the process of step S053. If the numerical value indicating the temperature of the motor generator is less than or equal to the determination constant A (NO at step S052), the flow returns to START. If the numerical value indicating the temperature of the motor generator is greater than the determination constant A, the B&C control request section 202 sends a request for the execution of the overheat limiting burn-and-coast control procedure to the DSS-ECU 10.

At step S053, the B&C control permission section 102 determines whether the conditions for performing the overheat limiting burn-and-coast control procedure are met. Since the determination of whether the conditions for performing the overheat limiting burn-and-coast control procedure are met is made in the same manner as that described with reference to FIG. 7, the detailed description is omitted.

At step S053, if it is determined that the conditions for performing the overheat limiting burn-and-coast control procedure are met, the flow proceeds to the process of step S054. If it is determined that the conditions for performing the overheat limiting burn-and-coast control procedure are not met, the flow returns to START.

At step S053, if it is determined that the traveling conditions are safe, and the conditions for performing the overheat limiting burn-and-coast control procedure are met, the B&C control permission section 102 transmits the B&C control permission signal to the MG-ECU 20.

At step S054, the B&C control execution section 203 of the MG-ECU 20 determines whether the numerical value indicating the temperature of the motor generator of the MG/INV 601 is greater than the determination constant A and less than the determination constant B. If the numerical value indicating the temperature of the motor generator is greater than the determination constant A and less than the determination constant B (YES at step S054), the flow proceeds to the process of step S056. If the numerical value indicating the temperature of the motor generator is greater than the determination constant A and greater than or equal to the determination constant B (NO at step S054), the flow proceeds to the process of step S055.

At step S055, the B&C control execution section 203 sets the acceleration in the overheat limiting burn-and-coast control procedure to be relatively great so that the motor efficiency is maximized. At step S056, the B&C control execution section 203 sets the acceleration in the overheat limiting burn-and-coast control procedure to be smaller than the case in step S055 so that the motor efficiency is relatively high.

At step S057, the B&C control execution section 203 sets the target torque of the motor generator to achieve the acceleration set in step S055 or step S056 and outputs the target torque to the MG/INV 601.

At step S058, the target torque is output by the motor generator of the MG/INV 601. At step S059, the B&C control execution section 203 transmits a torque output instruction to the Eng-ECU 40 so as to cancel out the torque fluctuation of the motor generator by the engine 607.

One example of the torque change and the change in the motor generator temperature when the overheat limiting burn-and-coast control procedure described with reference to FIG. 5 is executed will be described with reference to FIG. 9. FIG. 9(A) shows changes in the motor generator temperature when the overheat limiting burn-and-coast control procedure is not executed. FIG. 9(B) shows a flag indicating whether to execute the overheat limiting burn-and-coast control procedure. FIG. 9(C) shows the output torque of the motor generator and the engine torque. FIG. 9(D) shows changes in the motor generator temperature when the overheat limiting burn-and-coast control procedure is executed.

At a point in time t1, the determination of step S053 of FIG. 5 is made, and if it is determined that the conditions for executing the overheat limiting burn-and-coast control procedure are met, the overheat limiting burn-and-coast control procedure is started with the acceleration set in step S055 or step S056.

The time period from the point in time t1 to a point in time t2 corresponds to the acceleration phase (burn phase), and a high-efficiency torque that is higher than the normal traveling torque is outputted to the motor generator. The engine torque is generated to cancel out the torque. The motor generator is overheated due to the acceleration from the point in time t1 to the point in time t2. However, since the torque is output to achieve high-efficiency operation, the amount of overheating is relatively small.

The time period from the point in time t2 to a point in time t3 corresponds to the deceleration phase (coast phase), and no torque is output to the motor generator. The engine torque higher than the normal traveling torque is generated so as to make up for the zero torque output. During the time period from the point in time t2 to a point in time t3, the temperature of the motor generator is decreased due to the effect of the airflow that is taken in during deceleration and directly cools the motor generator and the effect of the airflow that cools the coolant circulating in the radiator 603 and indirectly cools the motor generator.

Performing the overheat limiting burn-and-coast control procedure in this manner inhibits the motor generator from being overheated compared with a case in which the overheat limiting burn-and-coast control procedure is not performed.

The present embodiment has been described with reference to specific examples. However, the present disclosure is not limited to these specific examples. The specific examples in which the design is modified by those skilled in the art are included in the scope of the present disclosure as long as the examples include the characteristics of the present disclosure. The components of the specific examples and their arrangements, conditions, and shapes are not limited to the illustrated examples, but may be modified as required. The combinations of the components of the above-described specific examples may be changed as required as long as no technical contradiction arises.

As described above, conventionally a travelling control apparatus has been disclosed, in which an increase in the temperature of a motor and an inverter is inhibited in a vehicle that travels by a driving force of the motor to improve the traveling performance of the vehicle. In the control apparatus, if it is determined that a road condition within a predetermined distance from the current position of the vehicle is in a condition in which the temperature of the motor is predicted to increase to a predetermined temperature or more based on the current position of the vehicle and map information, the motor is driven in a range that limits a low-speed, high-torque region in the range of the rated maximum torque of the motor. This inhibits the increase in the temperature of the motor and the inverter due to the operation of the motor under a high load and improves the traveling performance of the vehicle. According to another example of the control apparatus, if a higher priority is put on inhibiting the increase in the temperature of the motor, the motor cannot be driven in the low-speed, high-torque region. This may hinder everyday driving. However, if the motor is driven in the low-speed, high-torque region so as not to hinder everyday driving, the increase in the temperature of the motor may no longer be inhibited.

The present disclosure is a travel control apparatus that controls a traveling state of a vehicle that travels by a driving force generated by a motor. The travel control apparatus includes a motor temperature acquisition section and a control switching determination section. The motor temperature acquisition section acquires a temperature of the motor. The control switching determination section determines whether to allow switching to an overheat limiting burn-and-coast control procedure that varies electric supply to the motor to be increased and decreased across the amount of electric supply required for constant speed traveling based on the temperature of the motor acquired by the motor temperature acquisition section.

When the overheat limiting burn-and-coast control procedure, which varies electric supply to the motor to be increased and decreased across the amount of electric supply required for constant speed traveling, is executed, the vehicle is put in a traveling state that repeats acceleration and deceleration if assistance to the engine is not considered. While the amount of heat generation of the motor is increased during acceleration since the current that flows through the motor is increased compared with a case in which the vehicle is traveling at a constant speed, the motor is cooled during deceleration since the current that flows through the motor is decreased compared with a case in which the vehicle is traveling at a constant speed. When the traveling state that repeats acceleration and deceleration is compared with the constant speed traveling, the traveling state that repeats acceleration and deceleration to repeat heating and cooling of the motor inhibits the increase in the temperature of the motor better. Thus, determining whether to allow switching to the overheat limiting burn-and-coast control procedure based on the temperature of the motor prevents excessively limiting the driving of the motor, controls divergence of the average vehicle speed from the constant speed traveling to be within a predetermined range by repeating acceleration and deceleration of the vehicle, and inhibits excessive increase in the temperature of the motor. Preferred embodiment may also include assisting the engine to inhibit acceleration and deceleration of the vehicle even if the overheat limiting burn-and-coast control procedure is executed since the increase in the temperature of the motor is inhibited by executing the overheat limiting burn-and-coast control procedure, which varies electric supply to the motor to be increased and decreased across the amount of electric supply required for constant speed traveling.

According to the present disclosure, a travel control apparatus that inhibits an increase in the temperature of a motor without hindering everyday driving is provided.

What is claimed is:

1. A travel control apparatus for controlling a traveling state of a vehicle that travels by a driving force generated by a motor, the travel control apparatus comprising:
    a motor temperature acquisition section configured to acquire a temperature of the motor;
    a surrounding condition acquisition section configured to acquire a surrounding condition of the vehicle; and
    a control switching determination section configured to autonomously determine whether to allow switching to an overheat limiting burn-and-coast control procedure that varies electric power to the motor to be increased and decreased across an amount of electric power required for constant speed traveling based on the temperature of the motor acquired by the motor temperature acquisition section and the surrounding condition of the vehicle acquired by the surrounding condition acquisition section.

2. The travel control apparatus according to claim 1, wherein
    the control switching determination section is configured to autonomously determine the switching to the overheat limiting burn-and-coast control procedure additionally based on ease of cooling the motor.

3. The travel control apparatus according to claim 1, wherein
    the motor temperature acquisition section is configured to acquire the temperature of the motor from a motor temperature sensor, which directly measures the temperature of the motor.

4. The travel control apparatus according to claim 1, wherein
    the motor temperature acquisition section is configured to acquire the temperature of the motor based on a measured value of current that flows in an electrical system outside the motor that correlates with the temperature of the motor.

5. The travel control apparatus according to claim 1, wherein
    the motor temperature acquisition section is configured to acquire the temperature of the motor based on an outside-air temperature and a traveling plan of the vehicle.

6. The travel control apparatus according to claim 1, wherein
    the motor temperature acquisition section is configured to acquire the temperature of the motor based on an outside-air temperature and a traveling history of the vehicle.

7. The travel control apparatus according to claim 6, wherein
    the traveling history includes at least one of a fluctuation history of the outside-air temperature during traveling, a fluctuation history of supplied power to the motor, a fluctuation history of a coolant temperature in a radiator in which a coolant for cooling the motor circulates, an operating state history of a radiator fan, which supplies air to the radiator for heat exchange, and an operating state history of a water pump for circulating the coolant.

8. The travel control apparatus according to claim 1, wherein
    the overheat limiting burn-and-coast control procedure predicts how easily the temperature of the motor increases and sets a target acceleration in accordance with a predicted result.

9. The travel control apparatus according to claim 1, wherein
the overheat limiting burn-and-coast control procedure changes a cycle of acceleration and deceleration in accordance with a fluctuation of a vehicle speed or a charge level of a battery that supplies power to the motor.

10. A travel control apparatus for controlling a traveling state of a vehicle that travels by a driving force generated by a motor, the travel control apparatus comprising:
 a motor temperature acquisition section configured to acquire a temperature of the motor; and
 a control switching determination section configured to autonomously determine whether to allow switching to an overheat limiting burn-and-coast control procedure that varies electric power to the motor to be increased and decreased across an amount of electric power required for constant speed traveling based on the temperature of the motor acquired by the motor temperature acquisition section and ease of cooling the motor.

11. A travel control apparatus for controlling a traveling state of a vehicle that travels by a driving force generated by a motor, the travel control apparatus comprising:
 a motor temperature acquisition section configured to acquire a temperature of the motor from a motor temperature sensor, which directly measures the temperature of the motor; and
 a control switching determination section configured to determine whether to allow switching to an overheat limiting burn-and-coast control procedure that varies electric power to the motor to be increased and decreased across an amount of electric power required for constant speed traveling based on the temperature of the motor acquired by the motor temperature acquisition section.

* * * * *